United States Patent [19]

Conn et al.

[11] 4,034,231
[45] July 5, 1977

[54] OCEAN TIDE AND WAVE ENERGY CONVERTER

[76] Inventors: John L. Conn; George Spector, both of 3615 Woolworth Bldg., 233 Broadway, New York, N.Y. 10007

[22] Filed: Apr. 28, 1975

[21] Appl. No.: 541,051

[52] U.S. Cl. .................................. 290/53; 290/42; 417/330

[51] Int. Cl.² .................... F03B 13/10; F03B 13/12

[58] Field of Search .................... 415/7, 60, 66, 67; 417/100, 330, 331; 60/398, 498, 499; 290/42, 53

[56] References Cited
UNITED STATES PATENTS

| | | | |
|---|---|---|---|
| 687,074 | 11/1901 | Shepler | 415/67 |
| 916,860 | 3/1909 | Hale | 417/330 |
| 1,276,112 | 8/1918 | Reed | 290/53 |
| 1,811,565 | 6/1931 | Schwabacher | 290/53 |
| 3,697,764 | 10/1972 | Stanziola | 290/53 |

Primary Examiner—Gerald P. Tolin

[57] ABSTRACT

A machine for harnessing the motion of ocean waves in order to convert the motion energy into useful electrical power; the machine consisting of a large V-shaped frame, submerged near a beach, having its apex pointed away from the beach, and the frame supporting a series of water turbines connected to an electric generator so that incoming waves toward a beach move along the outer side of the frame while turning the turbine rotors, and outgoing waves moving along the inner side of the frame so to likewise influence turning the turbine rotors.

1 Claim, 10 Drawing Figures

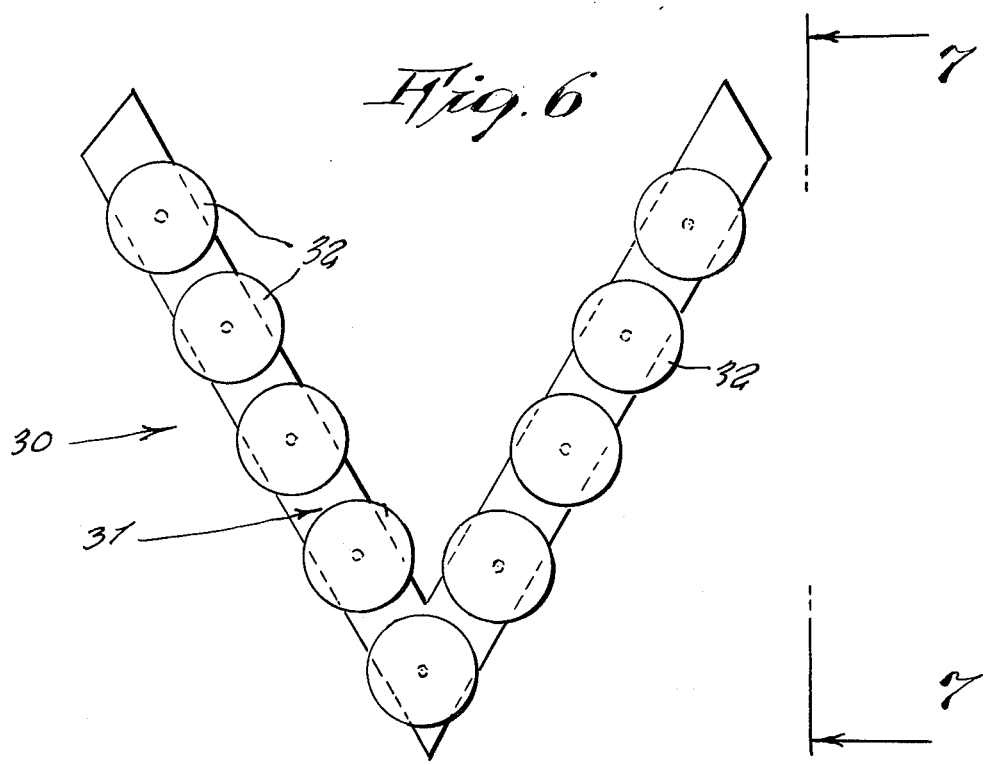
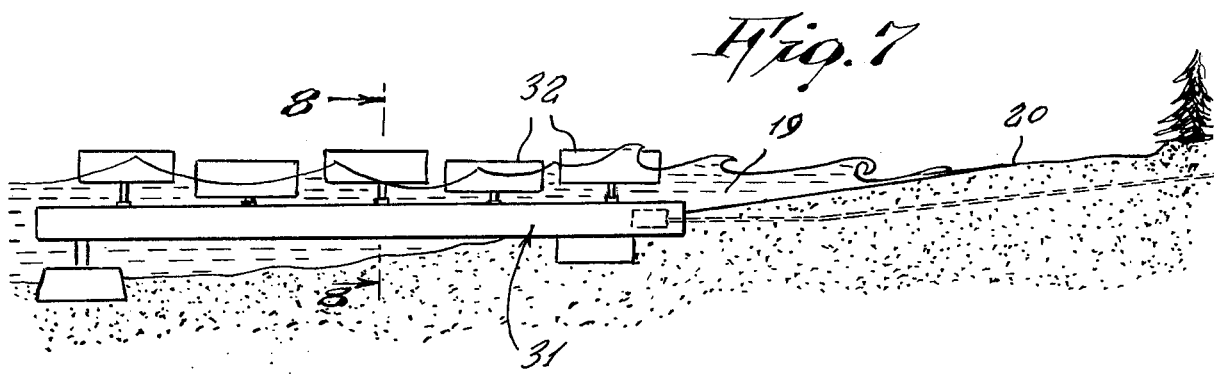
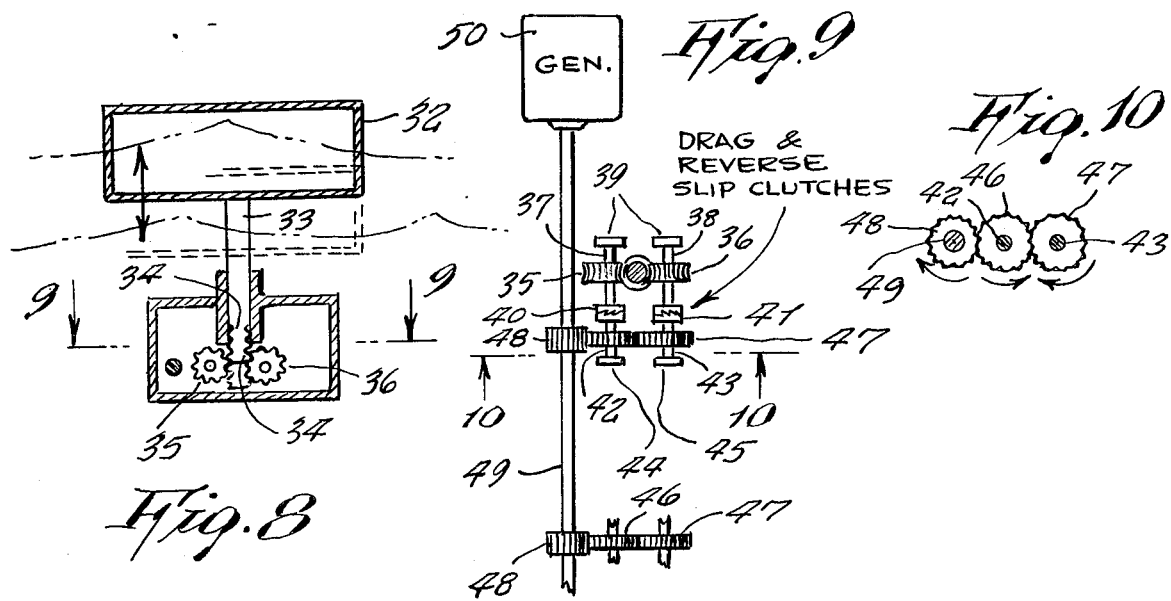

OCEAN TIDE AND WAVE ENERGY CONVERTER

This invention relates generally to power generators.

A principle object of the present invention is to provide an ocean machine which produces electrical power for human consumption, derived from the movement of ocean waves.

Another object is to provide an ocean machine which accordingly by harnesing a natural force produces a useful power without any cost, as it is not powered by any fuel.

Another object is to provide an ocean machine which accordingly does not create any air pollution, and does not use up any of the earth's resources that eventually run out such as coal and oil.

Another object is to provide an ocean machine which does not use up valuable land, which is a great deal out of sight, and which is relatively noiseless when compared to other power producing plants.

Other objects are to provide an ocean machine which is simple in design, inexpensive to manufacture, rugged in construction, easy to use and efficient in operation.

These and other objects will be readily evident upon a study of the following specification and the accompanying drawing wherein:

FIG. 6 is a top view of a modified design of the invention.

FIG. 7 is a side view thereof showing that the invention is operated by the rise and fall of the water surface caused by moving waves toward a beach.

FIG. 8 is a cross section on line 8—8 of FIG. 7.

FIG. 9 is a cross section on line 9—9 of FIG. 8.

FIG. 10 is a cross section on line 10—10 of FIG. 9.

Figure 1:
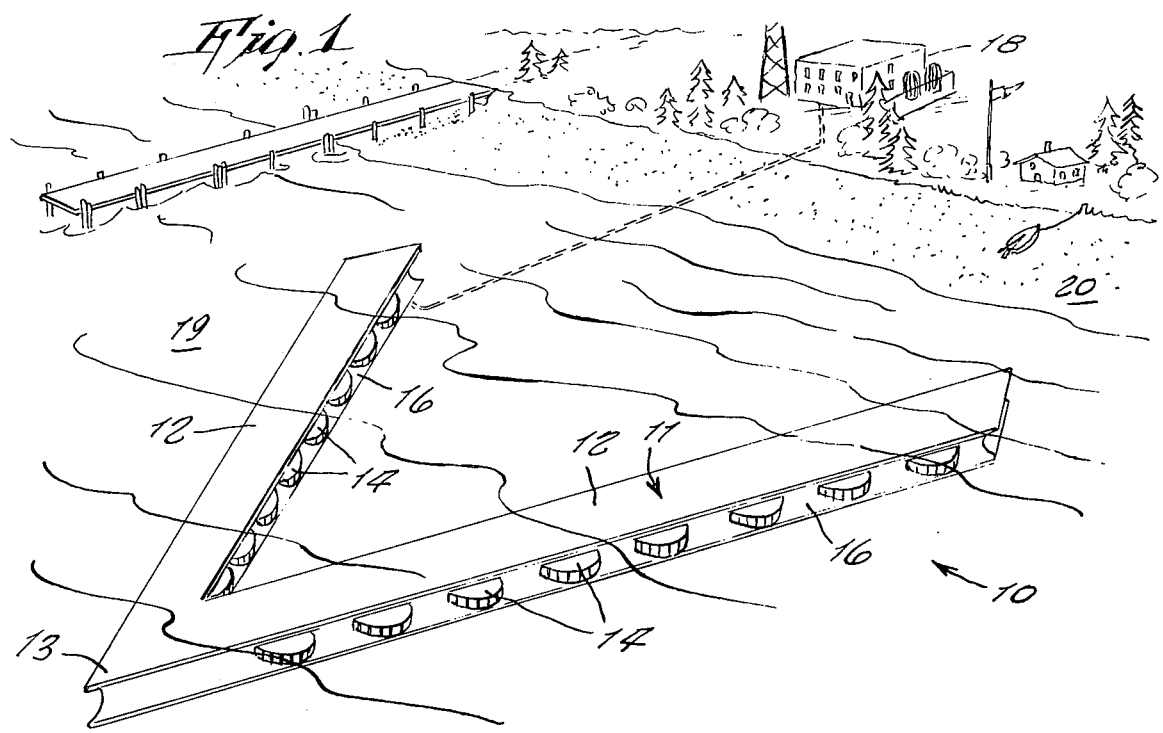
FIG. 1 is a perspective view of the invention shown in use.
Figure 2:
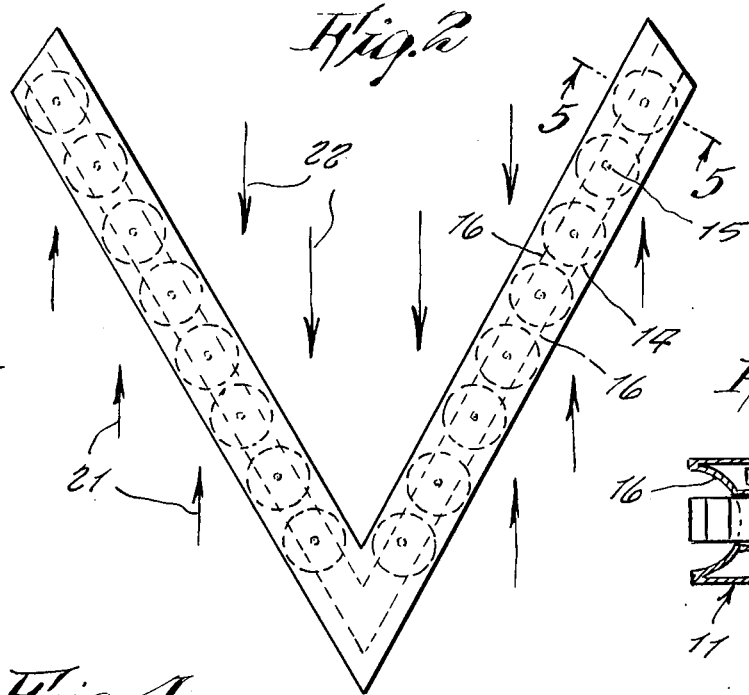
FIG. 2 is a top view of the invention.
Figure 3:
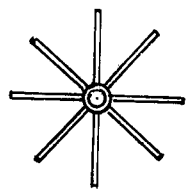
FIG. 3 is an enlarged detail of one of the turbine blade units.
Figure 5:
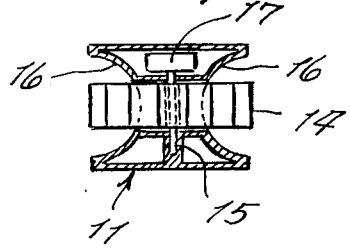
FIG. 5 is a cross section on line 5—5 of FIG. 2.
Figure 4:
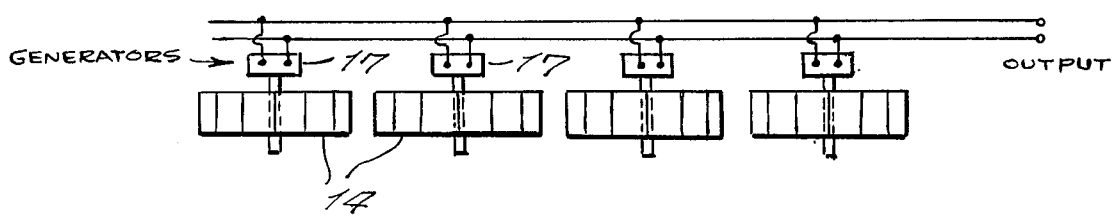
FIG. 4 is an electro-mechanical diagram of the invention circuit.

Referring now to the drawings in detail, and more particularly to FIGS. 1 to 5 at this time, the reference numeral 10 represents an ocean machine according to the present invention wherein there is a very large scale, V-shaped hollow frame or housing 11 in which the legs 12 thereof converge to an apex 13. The housing legs 12 each contain a row of turbine rotors 14 rotating about vertical shafts 15. The rotors are of a larger diameter than the width of the housing legs so that the rotor protrudes out of opposite side walls 16 thereof. Each of these sides is concave, as is clearly should in FIGS. 1 and 5. Each of the rotors drives its own electric generator 17 located within the housing, and the generators are then connected to an electric power cable that is connected to an electric service station 18 which provides electric service to a community, municipality or industry.

As shown in FIG. 1, the ocean machine is at least partially submerged within an ocean water 19 near a beach 20 where breakers are most likely to take place. The machine is positioned so that its apex points outward into the sea. As breaking waves come inshore, they run into the concavity of the outer side walls 16 as shown by arrows 21 and strike against the protruding turbine rotors with great force so to cause them to rotate so to drive the electric generators. After the waves has broken on the beach, the water thereof returns back out to sea as shown by arrows 22 and runs into the concavity of the inner side wall 16 so that they now exert a pressure on the diametrically opposite side of the turbine rotor so it continues to rotate in a same direction. Thus the water force is utilized in both directions.

It is appreciated that in an ocean wave, except for a breaker, there is no actual forward movement of the water itself, and only the motion of the wave travels. Therefore, the present invention is particularly suitable for use in shallower water, such as near a shore where a breaking wave actually does move the water ahead so it can be utilized. It is to be further noted, that the above described invention is also suitable for harnessing an ocean tide wherein the water itself actually moves, so that the machine can also be located near a shore as stated, or which more advantageously could be located in a mouth of a bay where a large volume of water is obliged to pass each time that the tide changes.

In FIGS. 6 through 10, a modified design of ocean machine 30 is shown that is driven by the wave motion rather than by actually traveling water, so that it can be placed either near a shore or else anchored out within deep water. The machine 30 includes a V-shaped housing 31 each leg of which supports a row of vertically movable floats 32 that rise and fall in response to wave motion, the floats each being attached to a downward shaft 33 having toothed racks 34 that engages gears 35 and 36 on shafts 37 and 38 journalled in stationary bearings 39 within the interior of the housing. Each shaft 37 and 38 is connected by a slip clutch 40 and 41 respectively to a shaft 42 and 43 journalled in bearings 44 and 45 and carrying a gear 46 and 47 respectively that engage each other and also a gear 48 located along an input shaft 49 of a singular large generator 50. It is now apparent that in this form of the invention the upward movement as well as the downward movement of the float is utilized to drive the generator, through means of the slip clutches, one of which slips when the float rises, and the other of which slips when the float descends. Thus at all times a vertically moving float in either direction, drives the generator. If at any time a float is not rising or falling due to no wave engaging it, the clutches will both slip so to not resist rotation of the generator shaft 49 in case another vertically moving float is driving the same.

Thus a modified design of the invention is provided.

While various changes may be made in the detail construction, it is understood that such changes will be within the spirit and scope of the present invention as is defined by the appended claims.

What is claimed is:

1. A machine for converting tidal and wave energy into electrical energy comprising a V-shaped frame emersed in water subjected to tidal and wave action said frame having an apex directed away from a shore line with integral legs diverging along linear axes towards said shoreline, said legs having aligned parallel upper and lower horizontal sides integral with transverse side walls, including means mounted movably in said legs, wherein said means include a vertical member intersecting the said linear axis of said legs at right angles thereto, in further combination with an electric generator and means for transmitting the motion of the first said means to drive the generator, in further combination with an electric cable connecting the generator to a power station for distribution of the generated electric energy wherein the first said means comprises a float secured to a vertically slidable shaft mounted on said frame, including toothed racks on said shaft engaging a pair of gears affixed on a pair of horizontal shafts journalled in said side walls symmetrically about said linear axis wherein said horizontal shafts are connected by slip clutches to a second pair of horizontal shafts which in turn are geared to drive said generator including means for causing one of said clutches to engage only upon vertical upward movement of the vertical shaft and the other of said clutches to engage only upon vertical downward movement of said vertical shaft.

* * * * *